United States Patent [19]

Andress, Jr.

[11] 3,879,177

[45] Apr. 22, 1975

[54] INHIBITION OF WAX CRYSTALLIZATION

[75] Inventor: Harry J. Andress, Jr., Pitman, N.J.

[73] Assignee: Mobil Oil Corporation, New York, N.Y.

[22] Filed: Jan. 8, 1973

[21] Appl. No.: 321,883

[52] U.S. Cl. .......................................... 44/62; 44/70
[51] Int. Cl. ............................ C10i 1/14; C10i 1/22
[58] Field of Search ............... 44/62, 70; 252/56, 52

[56] References Cited
UNITED STATES PATENTS

| 2,615,845 | 10/1952 | Lippincott et al. | 44/62 X |
| 2,677,662 | 5/1952 | Mikeska et al. | 252/56 |
| 2,694,685 | 11/1952 | Bartlett | 252/52 |

FOREIGN PATENTS OR APPLICATIONS

| 1,154,966 | 6/1969 | United Kingdom | 44/62 UX |
| 1,161,188 | 8/1969 | United Kingdom | 44/62 UX |

*Primary Examiner*—Paul F. Shaver
*Attorney, Agent, or Firm*—C. A. Huggett

[57] ABSTRACT

This specification discloses a process for inhibiting the crystallization of wax in a well from a waxy crude oil produced from a subterranean formation through the well. The process involves addition to the crude oil in the well, upon flowing from the subterranean formation, of an agent which is a copolymer of maleic anhydride and vinyl methyl ether esterified with an alcohol containing 18 to 24 carbon atoms.

12 Claims, No Drawings

INHIBITION OF WAX CRYSTALLIZATION

BACKGROUND OF THE INVENTION

1. Field of the Invention

This invention relates to the inhibition of the crystallization of wax in a well from a waxy crude oil produced from a subterranean formation into the well.

2. Description of the Prior Art

U.S. Pat. No. 2,615,845 discloses as a pour point additive for lubricating oil a copolymer of maleic acid or its anhydride with a vinyl ether, such as vinyl dodecyl ether, esterified with an alcohol such as octadecyl alcohol.

U.S. Pat. No. 2,677,662 discloses, as an additive for improving the pour point and the viscosity index of lubricating oils, a copolymer of maleic anhydride and a vinyl alkyl ether, the vinyl group containing 1 to 30 carbon atoms, esterified with alcohols containing up to 24 carbon atoms.

U.S. Pat. No. 2,694,685 discloses a pour point depressant and viscosity index improver for lubricating oils prepared by copolymerizing a vinyl ether such as methyl vinyl ether with dialkyl maleic acid ester of an alcohol containing 12 to 18 carbon atoms.

British Pat. No. 1,154,966, corresponding to Netherlands Patent No. 6,603,483, discloses that petroleum fuel may contain wax and the wax will separate out upon cooling. With further cooling, the wax/oil mixture will no longer flow. The pour point can be depressed by additives which may be an alkyl vinyl ether such as octyl- or laurylvinyl ether copolymerized with a long chain ester of maleic acid such as di-n-octadecyl maleate or a copolymer of maleic anhydride with a long chain vinyl ether such as n-docosylvinyl ether or n-tetracosylvinyl ether.

British Patent No. 1,161,188 corresponding to Netherlands Patent No. 6,709,453 discloses that crude oil may contain considerable quantities of wax. This wax gradually separates when the oil is cooled to below a certain temperature and the coherence of the separated wax crystals in spatial structures imparts a certain stiffness to the oil. When crude oil is produced from a well which passes through strata of lower temperatures than that of the oil-bearing formation, the oil coming into contact with the cold wall of the well may stiffen. The patent discloses that the flow properties of waxy crude oil may be improved by adding thereto an additive which may be an alkyl vinyl ether such as octyl vinyl ether copolymerized with a dialkyl ester of an unsaturated dicarboxylic acid such as di-n-octadecyl maleate.

SUMMARY OF THE INVENTION

In accordance with the invention, crystallization of wax in a well from a waxy crude oil produced from a subterranean formation through the well is inhibited by adding to the waxy crude oil in the well an agent which is a copolymer of maleic anhydride and vinyl methyl ether esterified with an alcohol containing 18 to 24 carbon atoms.

DESCRIPTION OF THE PREFERRED EMBODIMENTS

It is well known that crude oils contain components designated as wax which remain soluble in the crude oil as long as the crude oil remains above a minimum temperature. This temperature depends upon various factors including the composition of the crude oil and the composition of the wax. When the waxy crude oil leaves the subterranean formation from which it originates and enters the well through which the oil is to be brought from the subterranean formation to the surface of the earth, the oil may be subject to a decrease in temperature. Further, as the crude oil ascends through the well it is subject to a further decrease in temperature since normally the temperatures of the strata through which the well passes decrease as the distance of the strata from the surface of the earth decreases. Depending upon the temperature to which the crude oil is decreased, the wax may no longer remain soluble and will begin to crystallize to the solid form. With crystallization of the wax, the viscosity of the oil will increase and with increase in viscosity the rate of flow of the oil in the well will decrease. Further, with crystallization of the wax, the solid wax may adhere to the surfaces of the production equipment in the well such as in the tubing or in pumps. Adherence of the wax decreases the capacity of the production equipment to the flow of the oil with resultant further decrease in the rate of flow of the oil in the well. In aggravated cases, complete stoppage in flow of the oil may occur.

By the process of the invention, crystallization of wax from a waxy crude oil in a well is effectively inhibited. The agent which is a copolymer of maleic anhydride and vinyl methyl ether esterified with an alcohol containing 18 to 24 carbon atoms, upon addition to the crude oil in the well, effects a reduction in the temperature at which the wax will crystallize from the oil. Thus, reduction in the rate at which the oil may be produced as a result of wax deposition is reduced or even eliminated.

The agent, i.e., the esterified copolymer, may be produced in a single step or in two steps. For example, the esterified copolymer may be produced by copolymerizing the maleic anhydride and the vinyl methyl ether in the presence of the desired alcohol whereby the esterified copolymer is produced in one step. Further, for example, the esterified copolymer may be produced by copolymerizing the maleic anhydride and the vinyl methyl ether in a first step and thereafter esterifying the resulting copolymer with the desired alcohol in a second step.

In the production of the copolymer it is preferred that one mole of maleic anhydride be reacted with one mole of vinyl methyl ether. However, more or less than one mole of maleic anhydride may be reacted with one mole of vinyl methyl ether. Thus, the copolymer may contain some unreacted maleic anhydride or some unreacted vinyl methyl ether. On the other hand, the copolymer should not contain more than 5% by weight of unreacted maleic anhydride or vinyl methyl ether.

Further, in the production of the esterified copolymer, one mole of the copolymer is reacted with at least one mole of the alcohol. However, it is preferred that one mole of the copolymer be reacted with two moles of the alcohol. In this way, both of the carboxyl groups of the copolymer will be esterified. More than two moles of the alcohol may be reacted with one mole of the copolymer whereby the esterified copolymer will contain unreacted alcohol. However, it is preferred that the copolymer contain less than 25% by weight of unreacted alcohol. Esterification can be carried out at a temperature between about 100° C. and about 200°

C. and esterification is usually complete within a period of from about 1 to about 5 hours.

The alcohol employed for esterification may contain, as indicated, 18 to 24 carbon atoms. A single alcohol may be employed. Thus, octadecanol, nonadecanol, eicosanol, heneicosanol, docosanol, tricosanol, and tetracosanol may be employed. Preferably, docosanol is employed. However, a mixture of alcohols may also be employed. Thus, a mixture containing two or more of the alcohols just named may be employed. The mixture may contain some alcohol containing less than 18 carbon atoms and some alcohol containing more than 24 carbon atoms. However, it is preferred that mixture contain less than 3% by weight each of alcohols containing less than 18 and more than 24 carbon atoms.

In the practice of the invention, the esterified copolymer is mixed in the well with the crude oil entering the well from the oil-containing subterranean formation penetrated by the well. Any conventional procedure for mixing a material with the oil in the well may be employed. Thus, for example, the esterified copolymer may be injected or otherwise passed into the well at the surface of the earth into the annulus between the tubing and the casing whereby the esterified copolymer will pass downward through the well in the annulus to join the crude oil entering the well. This procedure is suitable where the oil is being produced, and the oil brought to the surface of the earth, under the natural pressure of the formation. It is also suitable where the oil is brought to the surface of the earth through the well by pumping or by gas lift or by other means when the natural pressure in the subterranean formation is insufficient to do so. Where the oil is brought through the tubing to the surface of the earth by means of a hydraulically operated pump and the power fluid employed to operate the pump discharges into the well to join the crude oil being pumped, the esterified copolymer may be added to the power fluid prior to entering the well.

The esterified copolymer, depending upon its temperature and the amount of any unreacted maleic anhydride, vinyl methyl ether, or alcohol, is in the form of a waxy solid. It is preferred, therefore, to dissolve the esterified copolymer in a solvent prior to mixing it with the crude oil in the well. By this means, solution of the esterified copolymer in the crude oil is facilitated. Any solvent may be employed in which the esterified copolymer is soluble and with which it is compatible and which is compatible with the crude oil and with its subsequent processing and use. For example, the esterified copolymer may be dissolved in xylene. Other solvents which may be employed include benzene and toluene. Gasoline and kerosene may also be employed. The esterified copolymer, and its solution in a solvent where a solvent is employed, may be heated in order to facilitate handling or dissolving in the crude oil or both.

When the esterified copolymer is employed dissolved in a solvent, the solution thereof may contain any suitable concentration of the esterified copolymer. However, the concentration of the esterified copolymer should be such that the viscosity of the solution at the temperature at which it is being handled for mixture with the crude oil is sufficiently low to be readily poured or otherwise moved from containers and pumped or otherwise moved through pipes or other transportation lines. Concentrations of the esterified copolymer in solutions of xylene or other similar solvents of 5–25% by weight are satisfactory. A particularly satisfactory concentration of the esterified copolymer in xylene is between 10 and 15% by weight.

The amount of the esterified copolymer to be mixed with the crude oil in the well for effective inhibition of crystallization of wax will depend upon various factors. These include the concentration and nature of the waxy components of the crude oil and the lowest temperature that will be attained by the crude oil during the time that inhibition of wax crystallization is desired. This amount can be readily determined by adding increasing amounts of the esterified copolymer to samples of the crude oil, adjusting the temperature to the lowest temperature to be attained by the crude oil, and noting the concentration at which wax crystallization no longer occurs. For this purpose, the well known "cold finger" test can be employed. Satisfactory concentrations of the esterified copolymer in the crude oil will be of the order of 6 to 2500 parts per million by weight. Particularly suitable concentrations are 6 to 30, such as 18, parts per million by weight. However, as indicated, the precise concentrations can be determined by test.

The esterified copolymer is compatible with the crude oil and with its subsequent processing and use. Thus, it is not necessary to remove the esterified copolymer from the crude oil after the oil has been removed from the well. Accordingly, the produced crude oil, without any treatment to remove the esterified copolymer or otherwise to counteract the presence of the esterified copolymer, may be subjected, after leaving the well, to conventional treatment for the removal of water if necessary and sent to storage for subsequent refining or other desired processing.

Examples 1–4 will illustrate the preparation of the esterified copolymer.

EXAMPLE 1

A mixture of 23 grams (0.1475 mole) of methyl vinyl ether-maleic anhydride copolymer, 98 grams (0.295 mole) of docosanol, 6.05 grams (5%) of p-toluene sulfonic acid, 116 grams of a diluent comprising a 100″ refined pale paraffin oil, and 150 cubic centimeters of xylene was heated to reflux at 150° C. until water almost stopped coming over. The mixture was then gradually heated to 200° C. and was held there until water and xylene stopped completely coming over. The final product, the di-docosanol ester of methyl vinyl ether-maleic anhydride copolymer, which contained 50% of the aforementioned diluent was waxy at room temperature.

EXAMPLE 2

A mixture of 30 grams (0.192 mole) of methyl vinyl ether-maleic anhydride copolymer, 117 grams (0.386 mole) of a mixture of $C_{20}$-$C_{24}$ alcohols, 7.35 grams (5%) of p-toluene sulfonic acid, 143 grams of the diluent oil of Example 1, and 150 cubic centimeters of xylene was gradually heated to reflux at 155° C. until water almost stopped coming over. The mixture was then gradually heated to 200° C, and was held there until water and xylene stopped completely coming over. The final product, the $C_{20}$+ ester of methyl vinyl ether-maleic anhydride copolymer, which contained 50% of the aforementioned diluent was waxy at room temperature.

EXAMPLE 3

A mixture of 29.5 grams (0.189 mole) of methyl vinyl ether-maleic anhydride copolymer, 48 grams (0.159 mole) of eicosanol, 72 grams (0.219 mole) of docosanol, 7.5 grams (5%) of p-toluene sulfonic acid, 146 grams of the diluent oil of Example 1, and 150 cubic centimeters of xylene was gradually heated to reflux at 155° C. until water almost stopped coming over. The mixture was then gradually heated to 200° C. and was held there until water and xylene stopped completely coming over. The final product, the di-mixed (40 weight eicosanol plus 60 weight percent docosanol) ester of methyl vinyl ether-maleic anhydride copolymer, which contained 50% of the aforementioned diluent was waxy at room temperature.

EXAMPLE 4

A mixture of 15.6 grams (0.1 mole) of methyl vinyl ether-maleic anhydride copolymer, 31.2 grams (0.1 mole) of docosanol, 1.4 grams of p-toluene sulfonic acid, 94 grams of the diluent oil of Example 1, and 150 cubic centimeters of xylene was heated to reflux at 150° C. until water stopped evolving. The mixture was then gradually heated to about 200° C. and held there until water and xylene stopped coming over. The final product, the mono-docosanol ester of methyl vinyl ether-maleic anhydride copolymer, contained about 66⅔% diluent oil.

I claim:

1. In a process for the production of a waxy crude oil from a subterranean formation through a well leading from said formation to the surface of the earth, the step for inhibiting crystallization of wax from said waxy crude oil comprising mixing with said waxy crude oil in said well about 6 to 2500 parts per million by weight of an agent prepared by esterifying a copolymer of maleic anhydride and vinyl methyl ether with docosanol.

2. The process of claim 1 wherein said copolymer is esterified with a mixture of alcohols containing 18 to 24 carbon atoms.

3. The process of claim 1 wherein said agent is in solution in a solvent upon mixing with said waxy crude oil.

4. The process of claim 3 wherein said solvent is xylene.

5. The process of claim 3 wherein said agent is in solution in said solvent in a concentration of 5–25% by weight.

6. The process of claim 3 wherein said agent is in solution in said solvent in a concentration of 10–15% by weight.

7. The process of claim 1 wherein said agent is mixed with said oil in an amount of 6 to 30 parts per million by weight.

8. The process of claim 1 wherein said agent is mixed with said oil in an amount of 18 parts per million by weight.

9. The process of claim 1 wherein each mole of said copolymer is esterified with one mole of said alcohol.

10. The process of claim 1 wherein each mole of said copolymer is esterified with two moles of said alcohol.

11. The process of claim 1 wherein said agent is mixed with said waxy crude oil in said well by passing said agent into said well through the annulus between the casing and the tubing of said well.

12. The process of claim 1 wherein said agent is mixed with said waxy crude oil in said well by adding said agent to a power fluid for operation of a downhole pump in said well which power fluid discharges from said pump into said well.

* * * * *